Patented Feb. 23, 1937

2,071,688

UNITED STATES PATENT OFFICE 2,071,688

METHOD OF PRODUCING PHOTOGRAPHIC DYESTUFF IMAGES

Béla Gaspar, Brussels, Belgium

No Drawing. Application December 7, 1932, Serial No. 646,212. In Germany December 9, 1931

15 Claims. (Cl. 95—6)

This invention relates to a method of producing photographic dyestuff images. It has already been proposed to incorporate dyestuffs in the sensitized layer and to convert the sensitized layer into the dyestuff image after the production of the photographic image. In this connection the absorption of the dyestuff acts in disturbing fashion upon the exposure or the production of the copy. To overcome this, various methods have already been proposed in which dyestuff forming substances are employed.

These methods, however, all possess the disadvantage—which will be explained in greater detail later—that the same are too complicated, the formation of the dyestuff being directly or indirectly dependent on the silver deposit.

The formation of the dyestuff takes place either through the medium of the silver image or its products of conversion. The process of formation first referred to occurs principally in the case of chromogeneous development. Methods of the second kind present a greater variety. Practically all of these, however, are accompanied by the feature that before the actual dyestuff forming reaction takes place the conversion of the silver image occurs over various intermediate stages. For example, the silver image is converted into lead chromate. This is performed in such fashion that at first the silver image is converted into ferro-cyanide of silver, the ferro-cyanide of silver into ferro-cyanide of lead, the ferro-cyanide of lead into lead chromate, and from the lead chromate the chromic acid is afterwards employed for oxidizing some suitable dyestuff forming substance, for example leuco esters of vat dyestuffs. It has also been proposed to produce azo dyestuff images along similar lines and also to employ other dye-forming substances. All of these processes are accompanied by the disadvantage that the same require a considerable length of time. Every intermediate stage necessary for obtaining the desired effect constitutes the source of numerous errors, which accumulate together and act in detrimental fashion on the final product. Apart from the length of time, the stated disadvantages render extensive use in practice very difficult. In addition to the methods referred to generally in the above, proposals have also been made to tan the gelatine layer likewise through the medium of the silver image, and to allow the formation of the dyestuff to take place subsequently at the tanned or the untanned points. These methods, however, are confined right from the commencement to one single layer, since, when using the tanning process in conjunction with a plurality of layers, a tanned point on the surface would also block the points situated thereunder.

The number of compounds, which together with the silver image or through the medium of the same result in a dye-forming compound are very small, and great limitation is imposed right from the commencement in the selection of the dyestuff forming substances and also the substances initiating the formation of the dyestuffs.

The disadvantages and drawbacks referred to in the above are overcome by the present invention.

The essence of the invention resides in principle in forming the dyestuff diffusely in the entire layer by a desired reaction wholly independently of the silver image, and to then destroy the resulting dyestuff at the points of the silver deposit or at the points which are free of deposit. This principle is employed in its broadest aspect, the same being open to modification insofar as in accordance with the invention it is also possible to destroy the dyestuff forming substance itself by the means used in the new process before the diffuse dyestuff formation takes place.

The present invention offers a very wide choice as regards the dyestuffs and dyestuff forming substances to be employed. Thus, for example, practically all reactions of the dyestuff formation on the photographic image are capable of use, with the exception of those, the employment of which in the photographic layer is fundamentally precluded, owing to the fact that the photographic layer will not withstand the temperature or duration of the reaction, which may be necessary, or a too complicated and lengthy conversion would be necessary for formation of the dyestuff, or also that dyestuff forming substances would require to be employed, which might exert detrimental effect on the silver halide or the finished silver image. Accordingly the dyestuff is formed in the layer independently of the silver image after the exposure and before or after the development, or also simultaneously therewith, and the colored image results from destruction of the formed dyestuff either at the points of the silver deposit or at the points which are free of silver.

It is accordingly much more simple to destroy the amount of dyestuff than to form the dyestuff in proportion or inverse proportion to the metal deposit. The destruction of the dyestuff is performed principally with the means set forth in my prior Patent No. 2,020,775, patented November 12, 1935, and in my copending application 44,633 filed October 11, 1935, which is divided from the said patent. These result in one single bath in a positive or negative dyestuff image from the diffusely colored metal deposit image dependent on the particular means employed. The destruction of the dyestuff itself may, however, also take place in accordance with any other desired process, for example by way of coupled or induced reactions, or by the selective bleaching of a mordanted or tanned image. However, the methods last referred to are somewhat tedious, and it is preferable to perform destruction of the dyestuff in one single bath, since, apart from loss of time, the formation of the image is better capable of control than if the image requires to pass through a plurality of intermediate reaction stages up to destruction of the dyestuff.

The photographic layer or the plurality of layers, which are situated in superimposed fashion or poured one over the other, and are sensitive to different colors, contain or receive one or more dyestuff forming components. These are then converted by reaction of a desired kind into the dyestuff, whereby, generally speaking, a diffuse and quantitative dyestuff formation takes place in the entire layer. The dyestuff forming substances may also be present in different color-sensitive particles of emulsion situated discontinuously one over or beside the other, such as result from atomization or the re-emulsifying of different emulsions. Alternatively the dyestuff components may be applied to a layer of silver halide by pressure, atomization or similar measures, possibly admixed with filter dyestuffs and sensitizers. The different color-sensitive emulsions or particles of emulsions naturally contain in addition to the dye-forming substances the sensitizer and possibly also a filter dyestuff. In the majority of cases it is sufficient to employ a yellow or red filter dyestuff.

The dyestuff forming substances, in the same manner as the dyestuffs in general, may belong to different chemical groups of substances, and will usually be of organic or inorganic kind. The examples of dyestuff-forming substances may preferably be divided according to the different known groups of dyestuffs. In the first place reference will be made to inorganic substances.

Different metal salts may be incorporated in the layer as far as possible in neutral or insoluble form, for example an insoluble iron or lead salt. The production of the dyestuff occurs by a desired reaction, for example a ferrosalt is converted with ferri-cyanide of potassium, to form Prussian blue, or the lead salt is converted with a chromate to form lead chromate. A diffuse blue or yellow image results in the layer. If a solution is used, acting in destructive fashion on the dyestuff in the presence of the silver image, possibly a solution according to the examples quoted in my prior patent above referred to, a reduction takes place by reason of this bath at the points of the silver image. The resulting Prussian blue or lead chromate, respectively, is destroyed at the points of the silver image. This in the present case constitutes a reduction, and in this manner a reversed image is obtained.

As a further example, zinc ferri-cyanide is incorporated in the layer. The same is developed with a ferro-oxalate developer, and a Prussian blue image is formed. In this way the dyestuff is formed simultaneously with the developing process. The same may then be converted subsequently in a bath according to the above example into a reversed image. Numerous other inorganic deposits or metal salts may be produced in this manner, which are then destroyed or decolored by oxidizing or reducing agents.

Among dyestuffs of an organic kind dyestuffs of practically all groups are capable of being produced in the layer, viz, nitro dyestuffs, nitroso dyestuffs, chinonimine dyestuffs, vat dyestuffs etc. In the case of the basic dyestuffs, the leuco base is incorporated in the layer, and this subsequently oxidized diffusely in the layer to form the dyestuff. The leuco base itself may be incorporated in the layer in the form of a finely divided deposit, a salt of phosphortungstic acid, molybdic acid or tannic acid. The oxidation to form the dyestuff takes place after development and fixing, and the dyestuff is then destroyed at the points of the silver deposit or at the points free of deposit. In this connection, the oxidation of the leuco base to form the dyestuff and subsequent destruction of the dyestuff may take place in one single bath. Naturally, for the production of multicolor images, a plurality of differently colored leuco bases may be also poured in different color-sensitive layers one over the other, and the reaction performed simultaneously in several layers.

The production of multicolor images in the plurality of layers, etc., as already referred to in the above, constitutes the main field of use of this process and applies to all examples set forth in the following:

There may be produced in the layer a nitro dyestuff, for example naphtholgreen Schultz Farbstofftabellen, 5th ed. No. 4, there being incorporated in the layer either a ferro salt or 1-nitro-2-naphthol-6-sulfonated sodium, or in place of the sodium salt another salt, for example 2-phenyl-4-amino-chinoline salt, and a ferro salt thereupon allowed to act. Naphtholgreen is formed. If a solution of thiocarbamide is allowed to act on the resulting naphtholgreen, a reversed dyestuff image is formed, and the dyestuff destroyed at the points of the silver image. The procedure, however, may also be such that 1-nitroso-2 naphthol-6-sulfonated salt is subjected to the action of this solution prior to the reaction with the iron salt. In this case, the nitroso group is reduced to the amino group at the points of the silver image and dyestuff is formed only at the unreduced points. The reverse step may also be adapted by incorporating a ferri salt in the layer and reducing this to ferro salt at the points of the silver image and then allowing the naphthalene compound referred to in the above to act on the image afterwards. In this manner a positive green image is obtained only at the points of the silver.

It will be apparent from these examples that the reactions are open to considerable variation. These reactions, however, are all characterized by the possibility of their simple and rapid performance and the avoidance of numerous intermediate reaction stages.

The process referred to in association with basic leuco substances also refers to leuco esters and ester salts and also ethers of vat dyestuffs and other preliminary stages of these dyestuffs of equivalent effect. Together with the oxidation of the leuco ester, etc., to form the dyestuff, there may also be performed destruction of the dyestuff at the points of the silver deposit or at the points free of silver. It is also possible to treat these after the oxidation which produces a diffuse coloring with thiocarbamide. In this connection the dyestuff is again reduced to form leuco dyestuff at the points of the silver image. Care must then either be taken that other weakly reducing agents, for example grape sugar, are present in the solution, which prevent the reforming or reoxidation of the dyestuff in the layer itself (or which, for example boric acid, constitute with the formed leuco body a soluble complex), or the leuco dyestuff again being esterized in the layer to form an air-resisting chemical body, for example by means of benzylizing ammonium bases, such as dimethylphenyl benzyl-ammonium salt or the corresponding sulphur acid of this salt.

Chinomine dyestuffs may also be produced in the layer by the oxidation of corresponding leuco compounds of these substances, or the same may be allowed to form in the layer by interaction of the components or oxidation of the components of the chinomine dyes of indo-phenols, indoanilines, indamines, azomethines, oxazines, thiazines, indothiophenols, etc., possibly also the coupling of nitroso bodies with phenols, etc. The destruction of the dyestuff takes place either by means of oxidizing baths, the oxidation already commenced simply being continued up to destruction of the dyestuff at certain points, or for example an indophenol being reduced to corresponding diphenylamine by local reduction. The production of the dyestuff may be so performed that nitrosodimethylaniline acts in the layer, for example on 1-naphthol (or a difficultly soluble naphtholate), and the dyestuff subsequently reduced at the points of the silver image. However, the formation of the dyestuff, as disclosed by the above examples, may also take place by the fact that nitrosodimethylaniline is introduced into the layer and the latter reduced at the points of the silver image, i. e. made incapable of coupling, and 1-naphthol then allowed to act on the layer.

It is also possible to produce an oxazine in the layer. For example, resorzene is allowed to act on nitrosomethylaniline in the presence of tannine. In this connection the layer, which contains the nitro base, is preferably reduced previously at the points of the silver deposit in proportion thereto.

A very large number of variations are presented by the production of azo dyestuffs in the layer. Three different phenols or coupling components may be incorporated in the layer and then developed with a diazonium salt. For example, two layers are poured one upon the other. The one contains a difficultly soluble salt (2-phenyl-4-amino chinoline salt) of SS-acid, the other layer the salt of G-acid. This is then coupled after the development of the silver image with 2-diazo-5-dimethylamino-4-methyl-phenyl sulfon. In the one layer there is formed a red and in the lower layer a blue dyestuff, which diffusely colors the layer. Following thereon the silver image is treated with a dyestuff destroying bath, which supplies a positive or negative image as desired at the points of the silver image or at the points which are free of deposit. Alternatively, durable diazo compounds or other durable products of conversion of the diazo compounds, such as diazo-amino compounds, triazenes or nitrosamines may be added to the layer itself, with or without coupling components. These dyestuff-forming substances, such as nitrosamines or diazonium compounds, may be destroyed at points prior to the coupling either by oxidation, or even more preferably by reduction, the nitrosamines or diazonium compounds being reduced at the points of the silver image to yield, for example the hydrazines, which, as well known, do not couple.

It is, however, also possible to incorporate in the layer hydrazines and to convert these subsequently into diazo compounds and then develop with phenols. Preferably the procedure is such that either different coupling components are introduced into the layer, which form with a common diazonium compound differently colored azo dyestuffs, or different diazonium compounds are incorporated in the layer or produced in the layer by diazotation, resulting with a common coupling component in an azo dyestuff.

To repeat briefly—there accordingly takes place after the ordinary development a second development with a diazonium salt, whereby the different azo components are coupled to form differently colored azo dyestuffs, or a diazonium compound is present for example in the layer, and this subsequently developed to form an azo dyestuff with an alkaline phenol. The developer itself may be contained in the original developer, for example the coupling body may be added to the alkaline developer, whereby simultaneously with the silver image there is produced a layer colored diffusely throughout with dyestuff. The destruction of the dyestuff at points then occurs subsequently, as described in the above. It is also possible to incorporate aromatic amines in the layer and to couple these to form azo dyestuffs by the action of nitrous acid and possibly rendering alkaline, which dyestuffs diffusely color the layer, and the image then results by destruction of the dyestuff at certain points, as described in the above.

It is also possible to employ substances which are merely relatively colorless. A green-sensitive layer which requires to be exposed to a green ray of light is for example also colorless as regards this green ray, if coloring is performed with a yellow dyestuff. The coloring of red-sensitive layer is also colorless as regards red rays of light, when coloring is performed, for example with a red-violet dyestuff.

Suitable for this purpose are, for example, the developing dyestuffs. These dyestuffs may then be diazotized in the layer by treatment with an acid sodium nitrite solution and subsequent coupling and converted into different colored compounds, for example in the manner I have already described previously in the French specification No. 702,615. The destruction of the dyestuff at points then occurs subsequently, as set forth in the above. For example, the green-sensitive layer is colored with a yellow dyestuff, such as amido-azobenzol (or its sulfo-acid). The underneath layer is colored with diazo pure blue B Ullmann, Enzyklopädie der Technischen Chemie, 3. ed. (1929) Vol. III p. 659. The dyestuffs are subjected to diazotization with sodium nitrite and developed with 2-naphthol or another coupling component. From the yellow dyestuff there has been obtained a red and from the red-violet a blue dyestuff. Naturally it is also possible to employ combined layers, there being used for the yellow image a practically colorless component, i. e. diazo-light yellow Fierz-David, Künstliche Organische Farbstoffe, Berlin 1926, page 154, and for the underneath layers colored components. It is, however, also possible to vary or deepen in color through the medium of coupling by treatment with a diazonium solution a dyestuff incorporated in the layer.

The dyestuff-forming substances, which are incorporated in the emulsion may be developed with different dyestuff-forming reactions. For example, 1-naphthalene is incorporated in the layer. This may either be developed with a diazonium solution to form an azo dyestuff, or the same may also be developed with nitroso-dimethylaniline to form an indo-phenol, or a body which contains an acid methylene group may serve for the production of either an azomethine dyestuff or an azo dyestuff.

On the other hand the layers consisting of one or more superimposed or otherwise combined layers, for example layers or equivalent arrangements of multi-layer material situated on both sides of a support, as mentioned above, may contain dyestuff-forming substances, which supply dyestuffs belonging to different groups. For example, a leuco ester and a substance forming with the developing dyestuff an amino compound or an azo dyestuff may be present in the layer. If now diazotization is performed with sodium nitrite, the leuco ester is oxidized to form dyestuff and at the same time the amino compound diazotized. In the subsequent alkaline coupling bath there is then formed in the layer an azo dyestuff, which contains the azo components. However, it is possible at the same time for an oxidation agent to simultaneously oxidize a leuco body and form a mineral dyestuff; for example, there is formed in a layer containing a lead salt lead chromate, while in the other part layer or in the particles of the layer a leuco ester is oxidized to form dyestuff by the chromic acid. The destruction of the dyestuff thus formed in the layer may then be performed in desired fashion according to the one or the other patents which I have previously obtained.

The light-sensitive layers prepared in the above manner may be employed for ordinary or also color photography. According to the above method it is possible to produce a reversed image or direct positive. In particular these methods are also suitable for the production of reversed representations for bond paper and single-color dyestuff images. The layers referred to in the above and containing the dyestuff components are employed for the production of multicolor images, these being employed either in immediate fashion for exposure purposes, or also as copying material (for example, diapositives, cinematograph films, paper images). As master images it is possible to employ either images or screen plates colored as desired, or copying may be performed in accordance with other methods, which I have described on previous occasions.

Generally speaking, only dyestuff-forming substances will be incorporated in the sensitized layers, which will result either in a coloring complementary to the color-sensitiveness, or result in a similar coloring to the color-sensitiveness of the layer. It is furthermore possible to employ dyestuff-forming substances, which impart to the layer a color which is independent of the color-sensitiveness. These are employed primarily for the production of master images for the purpose of copying on colored layers.

It will be understood that no limitation is made to the particular embodiments described in the above, and that numerous modifications are quite possible within the meaning of the above description and the annexed claims without departing from the spirit of the invention.

What I claim is:

1. A method of producing from at least one light sensitive silver halide emulsion layer arranged on a support and having incorporated therein dyestuff forming substances, photographic dyestuff images by the use of both a chemical substance reacting with and producing a dyestuff from the said dyestuff forming substances at all points where such dyestuff forming substance is present and of a chemical substance which locally destroys the coloring matter in proportion to the metallic silver present in the layer, which consists in exposing and developing the light-sensitive material and finally removing the silver image in a known manner after the formation of the dyestuff image, a solution of the dyestuff-producing substance being applied to the material at a point in the process after exposure, and a solution of the locally destroying agent being applied to the material at a point in the process not prior to development, and not after the removal of the developed silver image.

2. A method of producing photographic dyestuff images from at least one light sensitive silver halide emulsion layer arranged on a support and having incorporated therein dyestuff forming substances, by the use of both a chemical substance reacting with and producing a dyestuff from the said dyestuff forming substance at all points where such dyestuff forming substance is present and a chemical substance which locally destroys the dyestuff forming substance in proportion to the metallic silver present in the layer, which consists in exposing and developing the light sensitive material, applying a solution containing a substance for locally destroying the dyestuff-forming substance, at a point in the process including development and the subsequent steps, applying thereafter a solution of the dyestuff-producing substance, and finally removing the silver image after the formation of the dyestuff image in a known manner.

3. A method of producing photographic dyestuff images from at least one light sensitive silver halide emulsion layer arranged on a support and having incorporated therein dyestuff-forming substances capable of being destroyed by oxidation, by the use of both a chemical substance reacting with and producing a dyestuff from the said dyestuff forming substances at all points where such dyestuff components are present and a chemical substance of oxidizing properties which locally oxidizes and thereby destroys the dyestuff forming substance in proportion to the metallic silver present in the layer, which consists in exposing and developing the light sensitive material, applying a solution containing the oxidizing agent locally destroying the dyestuff forming substance at a point in the process after development and the subsequent steps and applying thereafter a solution of the dyestuff producing substance, and finally removing the silver image after the formation of the dyestuff image in a known manner.

4. A method of producing photographic dyestuff images from at least one light sensitive silver halide emulsion layer arranged on a support and having incorporated therein dyestuff-forming substances capable of being destroyed by reduction, by the use of both a chemical substance reacting with and producing a dyestuff from the said dyestuff-forming substances at all points where such dyestuff components are present, and of a chemical substance of reducing properties which locally reduces and thereby destroys the dyestuff forming substance in proportion to the metallic silver present in the layer, which consists in exposing and developing the light sensitive material, applying a solution containing the reducing agent at a point in the process including development and the subsequent steps, applying thereafter a solution of the dyestuff-forming substance, and finally removing the silver image after the formation of the dyestuff image in a known manner.

5. A method of producing photographic dyestuff images from at least one light sensitive silver halide emulsion layer arranged on a support and having incorporated therein inorganic salts being capable of being transformed into dyestuffs by the use of both a chemical substance reacting with and producing a dyestuff from the said inorganic salts at all points where such salts are present, and of a chemical substance which locally decomposes the said inorganic salts, in proportion to the metallic silver present in the layer, which consists in exposing and developing the light sensitive material, applying a solution containing a substance locally decomposing the inorganic salt at a point in the process including development and the subsequent steps, applying thereafter a solution of the dyestuff-forming substance, and finally removing the silver image after the formation of the dyestuff image in a known manner.

6. A method of producing photographic dyestuff images from at least one light sensitive silver halide emulsion layer arranged on a support and having incorporated therein dyestuff forming substances, by the use of both a chemical substance reacting with and producing a dyestuff from the said dyestuff-forming substances at all points where such dyestuff components are present and of a chemical substance which locally destroys the dyestuff in proportion to the silver image present in the layer, which consists in exposing and developing the light sensitive material, applying a solution of the dyestuff-producing substance to the material at a point in the process after exposure, then applying a solution containing the substance locally destroying the dyestuff, and finally removing the silver image after the formation of the dyestuff image in a known manner.

7. A method of producing photographic dyestuff images from at least one light sensitive silver halide emulsion layer arranged on a support and having incorporated therein azo-dyestuff-components, by the use of both a chemical substance reacting with and producing a dyestuff from the said azo-dyestuff components at all points where such dyestuff components are present, and of a chemical substance which locally destroys azo-dyestuffs in proportion to the silver image present in the layer, which consists in exposing and developing the light sensitive material, applying a solution of the azo-dyestuff-producing substance to the material at a point in the process after exposure then applying a solution containing the substance locally destroying the azo-dyestuff, and finally removing the silver image after the formation of the dyestuff image in a known manner.

8. A method of producing photographic dyestuff images from at least one light sensitive silver halide emulsion layer arranged on a support and having incorporated therein organic salts capable of being transformed into dyestuffs, by the use of both a chemical substance reacting with and producing a dyestuff from the said organic salts, at all points where such dyestuff components are present and of a chemical substance which locally destroys the dyestuff produced in proportion to the silver image present in the layer, which consists in exposing and developing the light sensitive material, applying a solution of the dyestuff producing substance to the material at a point in the process after exposure, then applying a solution containing the substance locally destroying the dyestuff, and finally removing the silver image after the formation of the dyestuff image in a known manner.

9. A method of producing photographic dyestuff images from at least one light sensitive silver halide emulsion layer arranged on a support and having incorporated therein leuco-bodies capable of being transformed into dyestuffs by oxidation, by the use of both an oxidizing substance reacting with and producing a dyestuff from the said leuco-bodies at all points where such dyestuff components are present, and of a chemical substance which locally destroys the dyestuff produced in proportion to the silver image present in the layer, which consists in exposing and developing the light sensitive material, applying a solution of the oxidizing substance being applied to the material at a point in the process after exposure, then applying a solution containing the substance locally destroying the dyestuff produced, and finally removing the silver image after the formation of the dyestuff image in a known manner.

10. A method of producing photographic dyestuff images from at least one light sensitive silver halide emulsion layer, arranged on a support and having incorporated therein diazo-compounds, by the use of both an azo-coupling component, coupling with and producing a dyestuff from the said diazo-compound at all points where such diazo-compounds are present, and of a chemical substance which locally destroys the azo-dyestuff in proportion to the silver image present in the layer, which consists in exposing and developing the light sensitive material, applying a solution of the coupling component to the material at a point in the process after exposure, then applying a solution containing the substance locally destroying the azo-dyestuff, and finally removing the silver image after the formation of the dyestuff image in a known manner.

11. A method of producing photographic dyestuff images from at least one light sensitive silver halide emulsion layer arranged on a support and having incorporated therein coupling components by the use of both a diazo-compound coupling with and producing a dyestuff from the said coupling components at all points where such coupling components are present and of a chemical substance which locally destroys azo-dyestuffs in proportion to the silver image present in the layer, which consists in exposing and developing the light sensitive material, applying a diazo-compound to the material at a point in the process after exposure, then applying a solution containing the substance locally destroying the azo-dyestuff, and finally removing the silver image after the formation of the dyestuff image in a known manner.

12. A method of producing photographic dyestuff images from at least one light sensitive silver halide emulsion layer arranged on a support and dyed by a dyestuff capable of being converted into a differently colored azo-dyestuff, by the use of both a chemical substance reacting with and producing an azo-dyestuff from the said dyestuff at all points where such dyestuff is present and of a chemical substance which locally destroys one of the said dyestuffs in proportion to the silver image present in the layer, which consists in exposing and developing the light sensitive material, applying a solution of the substance converting the dyestuff to the material at a point in the process after exposure, applying a solution containing the dyestuff destroying substance at an optional point in the process after exposure, and finally removing the silver image after the formation of the dyestuff image in a known manner.

13. A method of producing photographic dyestuff images from at least one light sensitive silver halide emulsion layer arranged on a support and having incorporated a dyestuff containing a diazotable amino-group, by the use of a diazotizing solution and a coupling substance, reacting with and producing an azo-dyestuff from the diazotized dyestuff at all points where such diazotized dyestuff is present and of a chemical substance which locally destroys one of the dyestuffs in proportion to the silver image present in the layer, which consists in exposing and developing the light sensitive material, applying a solution of the diazotizing substance and applying a solution of the coupling component to the material at a point of the process after exposure, applying a solution of the dyestuff destroying agent to the material at a point in the process after development, and finally removing the silver image after the formation of the dyestuff image in a known manner.

14. A light sensitive photographic material comprising a support and at least one silver halide emulsion layer on the said support, the emulsion being fastly dyed by diazo-light-yellow.

15. A light sensitive photographic material comprising a support and at least one silver halide emulsion layer on the said support, the emulsion being fastly dyed by a practically colorless colorforming substance possessing dyeing properties with respect to the emulsion layer.

BÉLA GASPAR.